(12) United States Patent
Weber et al.

(10) Patent No.: US 7,360,421 B2
(45) Date of Patent: Apr. 22, 2008

(54) DETACHABLE ANGULAR SPEED SENSING SYSTEM

(76) Inventors: Adi Weber, 14 Melbourne Rd., Great Neck, NY (US) 11021; Daniel Weber, 14 Melbourne Rd., Great Neck, NY (US) 11021

( * ) Notice: Subject to any disclaimer, the term of this patent is extended or adjusted under 35 U.S.C. 154(b) by 0 days.

(21) Appl. No.: 11/451,878

(22) Filed: Jun. 13, 2006

(65) Prior Publication Data

US 2007/0000325 A1   Jan. 4, 2007

Related U.S. Application Data

(60) Provisional application No. 60/595,413, filed on Jul. 1, 2005.

(51) Int. Cl.
*G01P 15/00* (2006.01)
*G01P 3/00* (2006.01)
*G01D 21/00* (2006.01)

(52) U.S. Cl. .................. 73/491; 73/488; 73/866.5; 324/160

(58) Field of Classification Search .......... 73/489–499, 73/866.5; 324/160, 166, 168
See application file for complete search history.

(56) References Cited

U.S. PATENT DOCUMENTS

| | | | | |
|---|---|---|---|---|
| 3,898,563 A | * | 8/1975 | Erisman | 324/166 |
| 4,009,509 A | * | 3/1977 | McCormick | 24/16 PB |
| 4,434,801 A | * | 3/1984 | Jiminez et al. | 600/502 |
| 4,532,710 A | * | 8/1985 | Kinney et al. | 33/772 |
| 4,807,265 A | * | 2/1989 | Swanson | 377/24.1 |
| 4,887,249 A | * | 12/1989 | Thinesen | 368/10 |
| 5,511,435 A | * | 4/1996 | Kitamura et al. | 73/865.9 |
| 5,517,728 A | * | 5/1996 | Woods | 24/16 PB |
| 6,490,507 B1 | * | 12/2002 | Campagnolo | 701/1 |
| 6,527,673 B1 | | 3/2003 | Chen | |
| 7,070,295 B1 | * | 7/2006 | Lee | 362/191 |
| 2002/0167140 A1 | | 11/2002 | Pike et al. | |
| 2003/0132612 A1 | | 7/2003 | Pike et al. | |

\* cited by examiner

*Primary Examiner*—Helen Kwok
(74) *Attorney, Agent, or Firm*—Collard & Roe, P.C.

(57) ABSTRACT

A system for sensing velocity of a wheeled vehicle has a flexible arm connected to a speed sensor and wireless transmitter at one end and to an adjustable strap or clamp at the other end. The strap is attached near the wheel to be measured. The sensor can then be positioned via the flexible arm to a location immediately adjacent the wheel. There is also a display unit connected to another strap or clamp. The display unit contains a wireless receiver that receives the data transmitted by the transmitter on the sensor, and a microprocessor that calculates the data and displays it for the user to view. A magnetic strip is attached directly to one of the wheels of the device. As the wheel rotates, the magnetic strip passes by the sensor positioned adjacent the wheel, and this passage is recorded by the sensor.

5 Claims, 6 Drawing Sheets

DETACHABLE ANGULAR SPEED SENSING SYSTEM

CROSS-REFERENCE TO RELATED APPLICATIONS

This application claims priority under 35 USC 119(e) of U.S. Provisional Application Ser. No. 60/595,413, filed on Jul. 1, 2005.

BACKGROUND OF THE INVENTION

1. Field of the Invention

This invention relates to a detachable angular speed sensing system for strollers or other wheeled devices. In particular, the invention relates to a speed sensing system that has a sensor adjacent a wheel of the device, which communicates through a transmitter to a display unit that is positioned in a remote location.

2. The Prior Art

Speed sensing systems have been used in the past for detecting the distance traveled or velocity of wheeled vehicles, such as bicycles. Sensors for bicycles are attached to the wheel support via a clamp which is within close proximity to the wheel. This clamp is a standard size suited only for the narrow wheel supports of bicycles. They are unsuitable for strollers, which have variable wheel support arrangements, variable distances from support to wheel, and thicker, smaller and often non-spoked wheels.

U.S. Pat. No. 6,527,673 to Chen discloses a sensor and counter for a specific kind of stroller—a jogging stroller. This jogging stroller closely resembles the wheel support and design of a bicycle. This sensor is strapped onto the stroller near the wheel to measure the number of revolutions of the wheel. However, this arrangement is not very stable or adaptable to various types of stroller arrangements, as the sensor can be placed in only one location relative to the strap.

SUMMARY OF THE INVENTION

It is therefore an object of the invention to provide a speed sensor for a stroller or other wheeled device, that can be attached to the device easily and can be used with devices having different sizes and arrangements.

The invention comprises a flexible arm connected to a speed sensor and wireless transmitter. The other end of the arm is connected to an adjustable strap or clamp. The strap is attached to the vehicle in a location near the wheel to be measured. This can be on the wheel support or other location. The sensor can then be positioned via the flexible arm to a location immediately adjacent the wheel. This is usually on the outside of the wheel so as to not interfere with the vehicle's braking system or other components. The sensor can also be rotated in such a way as to optimize the direction of the wireless transmission from the transmitter.

There is also a display unit connected to another strap or clamp. The display unit can be attached to a remote portion of the vehicle, where it can be easily viewed, or even to the user herself. The display unit contains a wireless receiver that receives the data transmitted by the transmitter on the sensor, and a microprocessor that calculates the data and displays it for the user to view.

The device additionally comprises a magnetic strip attached directly to one of the wheels of the device. Preferably, the strip is attached by a high bond adhesive. As the wheel rotates, the magnetic strip passes by the sensor positioned adjacent the wheel, and this passage is recorded by the sensor. Thus, despite the tremendous range of strollers, bicycles, wheelchairs, scooters, and other wheeled devices, the invention allows for a universal way to fix a spot on the surface of any rotating wheel, both spoked and non-spoked. The pulse caused by the passage of the magnet by the sensor is transmitted to the microprocessor in the display unit via the transmitter, and this data is used to calculate the speed and distance traveled by the wheel. The display unit can also perform other functions usually found on exercise or bicycle computers, such as time, temperature, heart rate, etc.

Unlike many previous devices, the sensor unit of the present invention can be placed in a variety of locations on the device and is not required to be attached to the front fork of a bicycle. The flexible arm allows for placement in a variety of ways, to accommodate virtually any type of wheeled vehicle. The adjustable strap can be used on components have a wide variety of sizes and shapes.

The strap for attaching the sensor unit is preferably comprised of heavy-duty rubber or flexible synthetic compound. In a preferred embodiment, the strap has a several teeth on one side and several corresponding apertures on another side, so that the strap can be wrapped around a component and secured by inserting the toothed portion through a selected aperture until the strap is tight around the component. Other variations of the strap, and other attachment devices, such as clamps, adhesives, etc. could also be used.

In a preferred embodiment, the flexible arm is about 6 inches long. However, the arm can be manufactured as short or as long as needed for the particular application.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
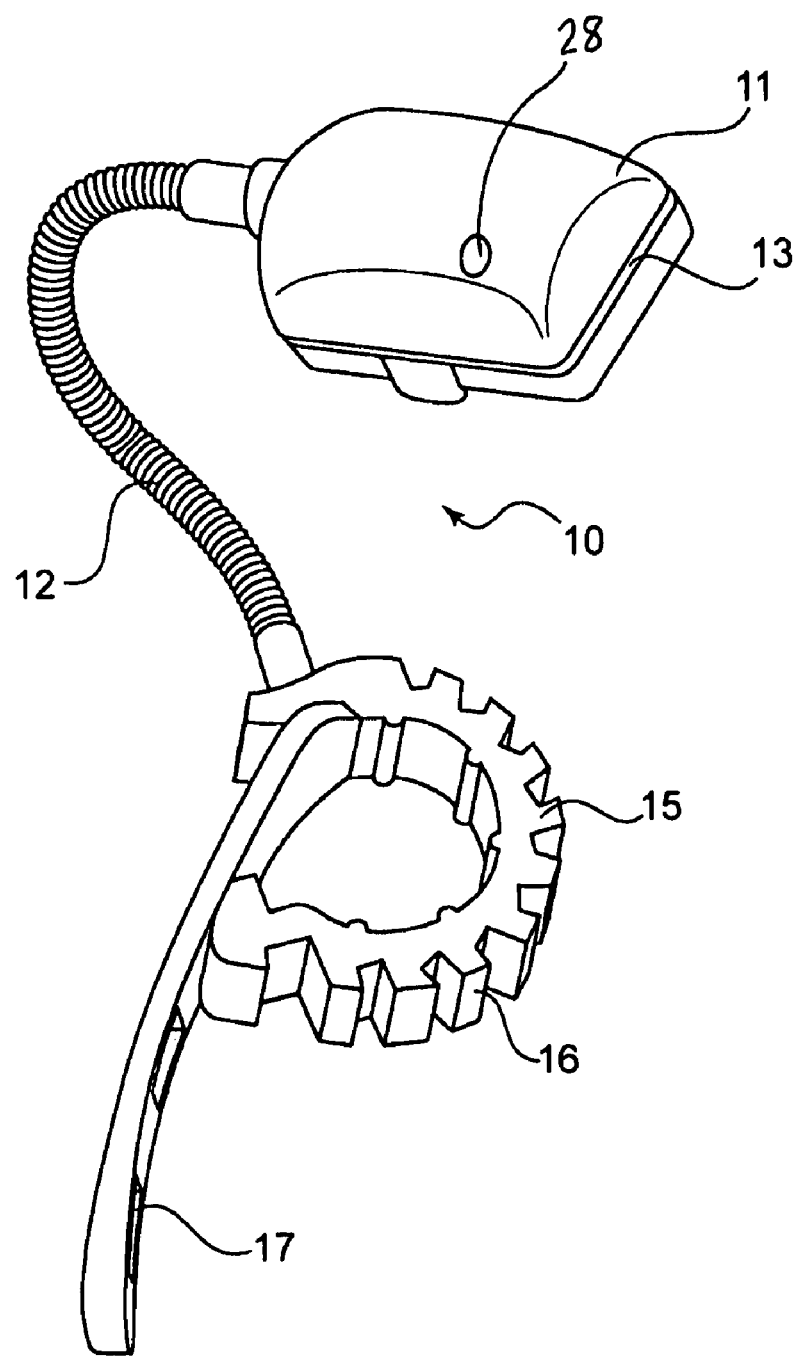
FIG. 1 shows a side view of the sensing unit according to the invention.
Figure 2:
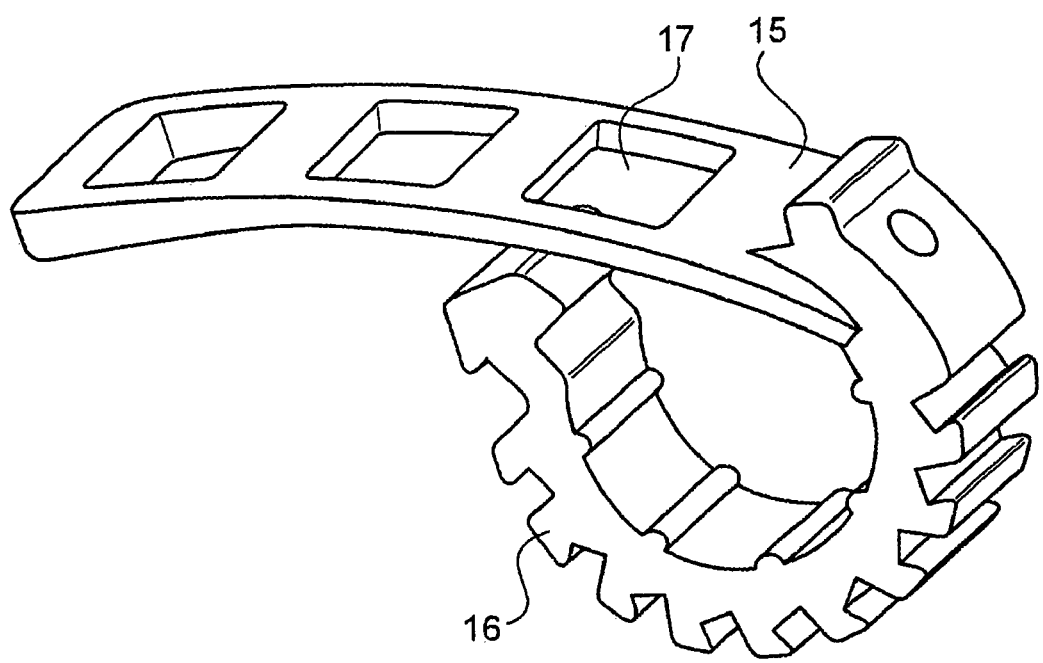
FIG. 2 shows a perspective view of the clamp for the sensing unit according to the invention.

Referring now in detail to the drawings and, in particular, FIG. 1 shows a view of the sensor arrangement 10 according to the invention. Sensor arrangement 10 has a sensor 11 attached to a flexible arm 12, which is connected at its other end to an adjustable strap 15. Connected to sensor 11 and within the sensor casing is a transmitter 13, which transmits pulses picked up by sensor 11, and a LED light 28 which indicates when the magnet has passed under the sensor. As also shown in FIG. 2, strap 15 has a plurality of protrusions 16, which can be inserted into one of a plurality of apertures 17 on the other side of the strap, to wrap strap 15 around bars or components of different sizes. Strap 15 is preferably formed from a flexible yet durable material, such as synthetic rubber.

Figure 3:
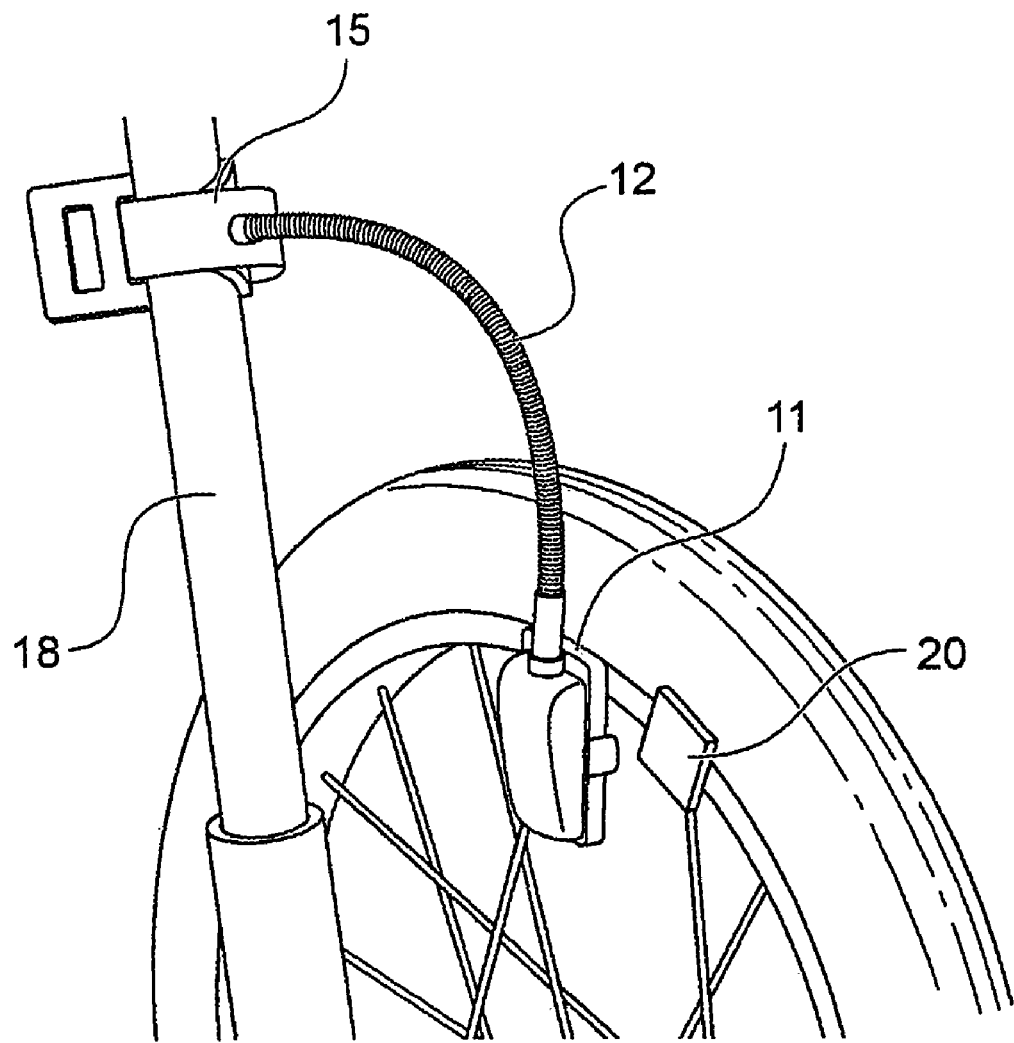
FIG. 3 shows the sensing unit attached to a wheel.
Figure 4:
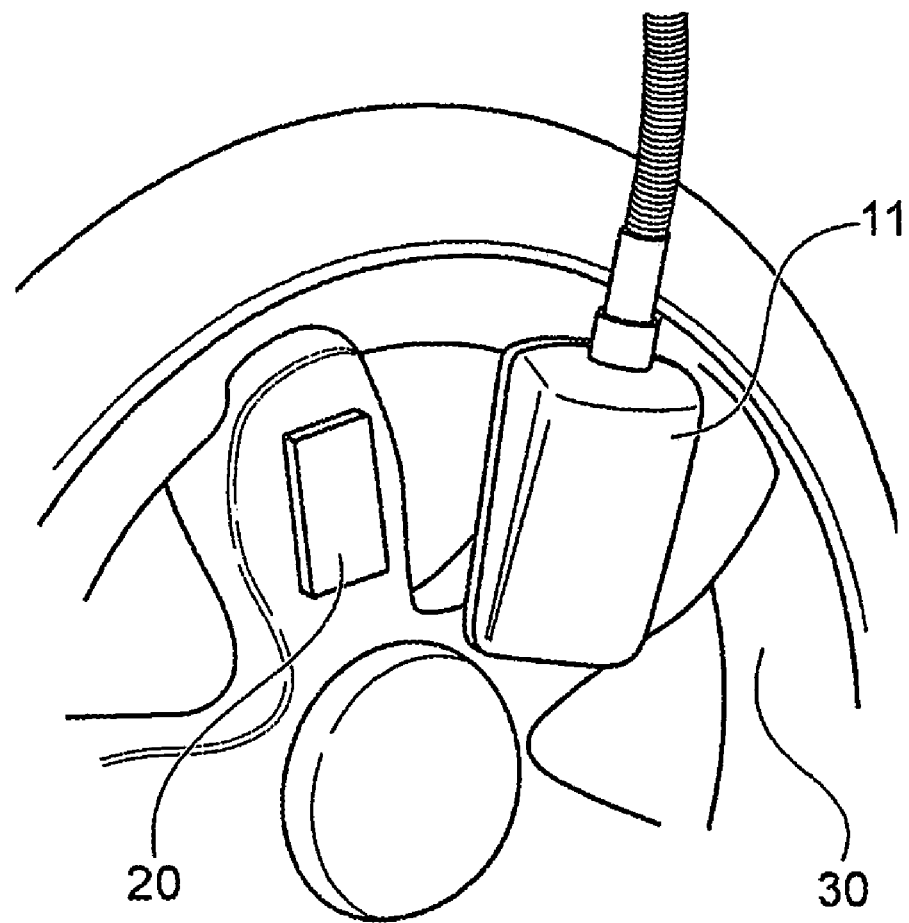
FIG. 4 shows an enlarged view of the sensing unit and magnet on a wheel.

As shown in FIGS. 3 and 4, sensor arrangement 10 is mounted onto a wheeled vehicle such as a stroller, by wrapping strap 15 around a post 18 or other component on the vehicle. Flexible arm 12 is then positioned so that sensor 11 is disposed adjacent to and facing one of the wheels of the stroller. Flexible arm 12 is easily positionable into many different positions, so that it can be used on a wide variety of different vehicles of varying sizes.

Figure 5:
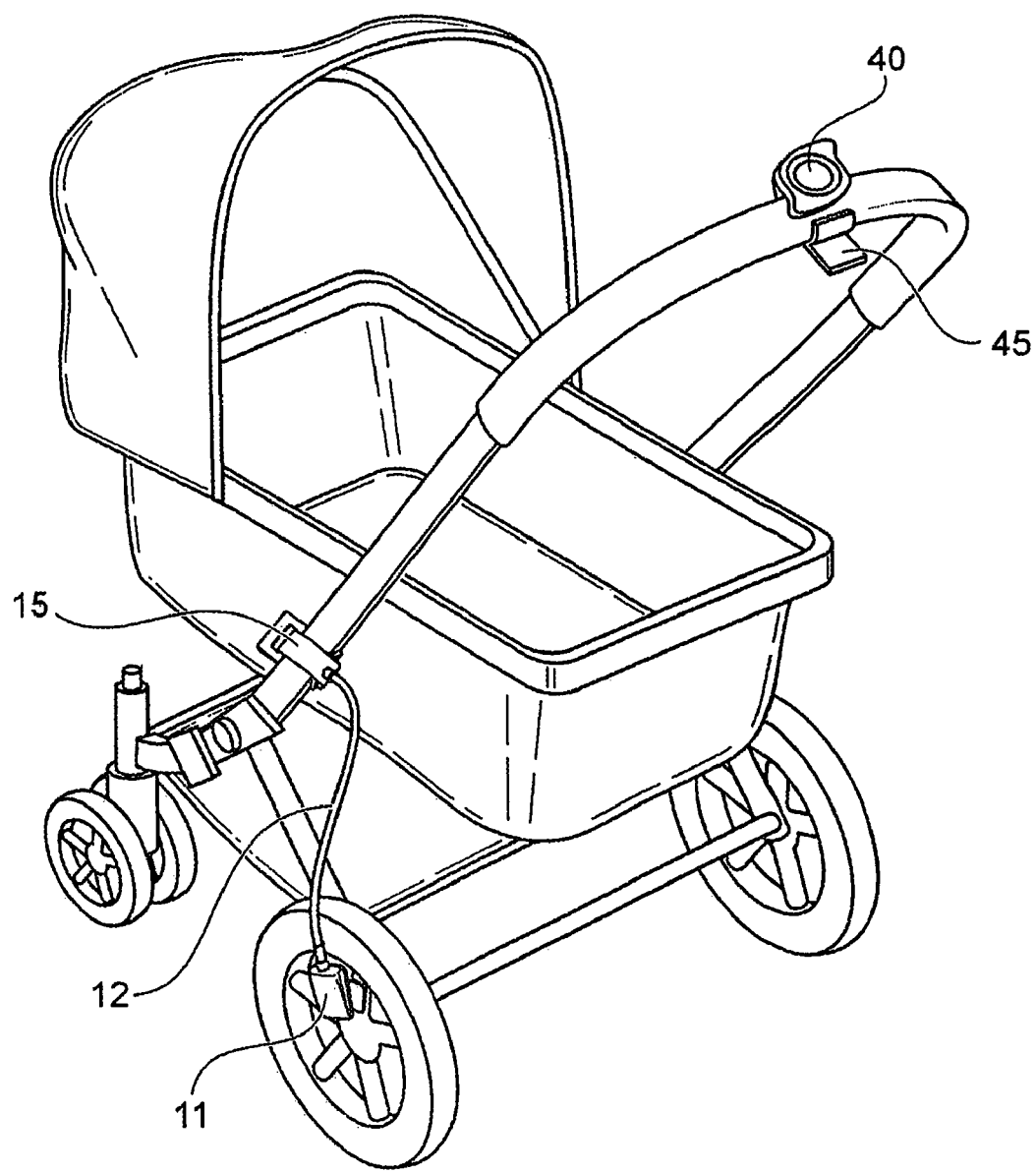
FIG. 5 shows a stroller having the sensing unit, magnet and display unit attached.

A magnet 20 is placed on the wheel 30 so that as the wheel rotates, the magnet passes by sensor 11, which detects a magnetic pulse from magnet 20. This pulse is then transmitted to a receiver in a remote display device 40, which is located in a remote part of the vehicle (see FIG. 5), via a strap 45. Other attachment devices for display device 40 could also be used.

Figure 6:
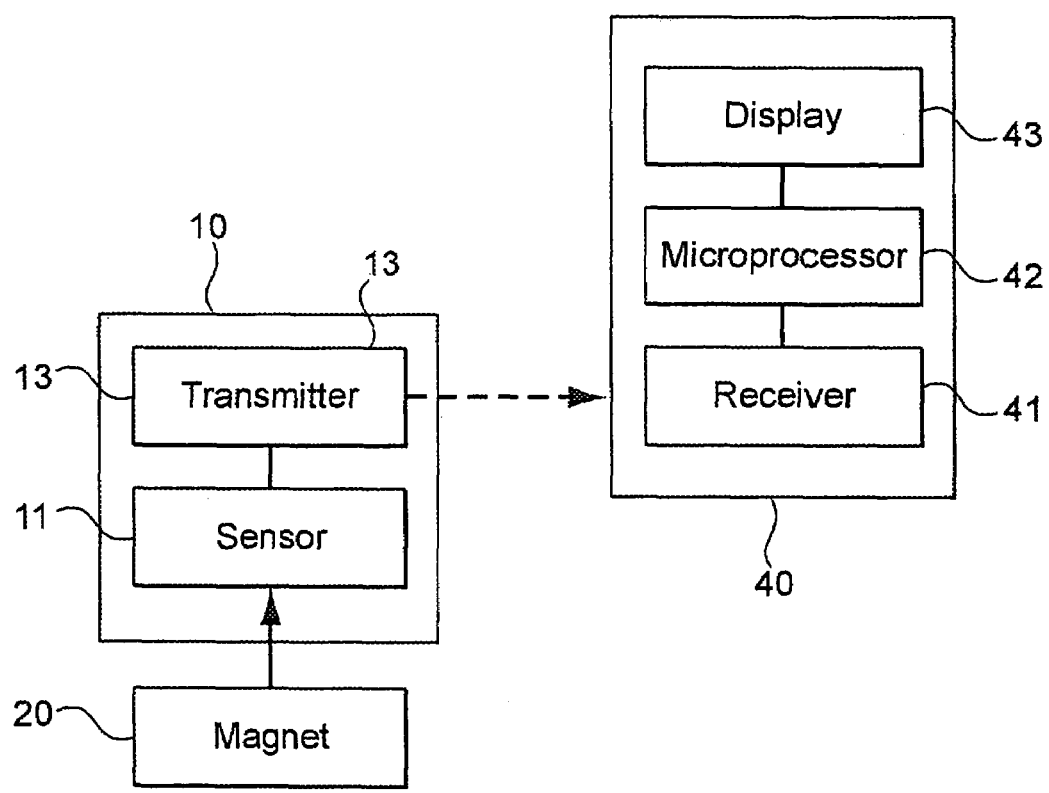
FIG. 6 shows a block diagram of all of the components of the system according to the invention.

FIG. 6 shows a block diagram of all of the components of the system. As shown in FIG. 6, the data from transmitter 13 is transmitted to a receiver 41 in display device 40, which communicates the data to microprocessor 42 which converts the magnetic pulse data into a readable form, so that the user can see his or her speed on the stroller via display 43. Display device 40 can be mounted on any part of the stroller, or even on the user. Display device 40 can be used to display many different types of data, including: current velocity, average velocity, maximum velocity, trip distance, trip time, and daily mileage, which are all calculated from the magnetic pulse data picked up by sensor 11. Display unit 40 can also be used to display other features unrelated to the sensor, such as current time and temperature.

The present invention provides a simple way to determine the speed and distance traveled of any wheeled vehicle. The adjustable strap and flexible arm of the sensing unit are adaptable to virtually any type of wheeled vehicle, and the unit is easily transferable from one vehicle to another. The system is especially useful for strollers, bicycles, wagons, wheelchairs, Segways®, or any other wheeled vehicle.

Accordingly, while only a few embodiments of the present invention have been shown and described, it is obvious that many changes and modifications may be made thereunto without departing from the spirit and scope of the invention.

What is claimed is:

1. A system for determining speed of a vehicle, comprising:
   a sensing unit comprising:
   (a) a sensor in a housing;
   (b) a transmitter connected to the sensor;
   (c) a flexible and positionable arm connected to the housing at one end for adjustably supporting the sensor in one of several different positions;
   (d) an adjustable securing device connected to another end of the flexible and positionable arm;
   (e) a LED light which indicates adequate proximity to a magnet;
   a display unit comprising:
   (a) a receiver for receiving data from the transmitter;
   (b) a microprocessor connected to the receiver for processing data received by the receiver; and
   (c) a display for displaying data processed by the microprocessor; and
   a magnet adapted to be connected to a spoked or non-spoked wheel of the vehicle,
   wherein when said magnet is connected to the vehicle wheel, and the sensing unit is connected to the vehicle via the securing device, the sensor can be positioned adjacent the magnet by moving the flexible arm into place so that the sensor receives pulses from the magnet as the magnet passes the sensor during rotation of the wheel.

2. The system according to claim 1, wherein the securing device is an adjustable length strap.

3. The system according to claim 2, wherein the strap comprises a plurality of apertures on one end and a plurality of protrusions on another end, such that said strap is secured by placing one of said protrusions through a selected one of said apertures to secure the strap tightly around an object.

4. The system according to claim 1, wherein the display unit displays at least one of the following data: current velocity, average velocity, maximum velocity, trip distance, trip time, and daily mileage.

5. The system according to claim 1, wherein the flexible and positionable arm is approximately 6 inches long.

* * * * *